United States Patent
Armstrong et al.

(10) Patent No.: US 11,664,521 B2
(45) Date of Patent: May 30, 2023

(54) FUEL CELL SYSTEM WITH ELECTRICAL CONTROL OF FUEL UTILIZATION AND METHOD OF OPERATING THEREOF

(71) Applicant: BLOOM ENERGY CORPORATION, San Jose, CA (US)

(72) Inventors: Tad Armstrong, Burlingame, CA (US); Harald Herchen, Los Altos, CA (US); David Weingaertner, Sunnyvale, CA (US); Rajan Surve, San Jose, CA (US); Matthias Gottmann, Sunnyvale, CA (US); Prasad Pmsvvsv, Sunnyvale, CA (US); Ranganathan Gurunathan, Bangalore (IN); Arne Ballantine, Incline Village, NV (US); Michael Gasda, Mountain View, CA (US); Tyler Dawson, Sunnyvale, CA (US); Chockkalingam Karuppaiah, Fremont, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 44 days.

(21) Appl. No.: 17/174,923

(22) Filed: Feb. 12, 2021

(65) Prior Publication Data
US 2021/0257645 A1 Aug. 19, 2021

Related U.S. Application Data

(60) Provisional application No. 62/977,936, filed on Feb. 18, 2020.

(51) Int. Cl.
| | |
|---|---|
| *H01M 8/04* | (2016.01) |
| *H01M 8/249* | (2016.01) |
| *H01M 8/2483* | (2016.01) |
| *H01M 8/0267* | (2016.01) |
| *H01M 8/04858* | (2016.01) |

(52) U.S. Cl.
CPC ......... *H01M 8/249* (2013.01); *H01M 8/0267* (2013.01); *H01M 8/0488* (2013.01); *H01M 8/0491* (2013.01); *H01M 8/2483* (2016.02)

(58) Field of Classification Search
CPC .. H01M 8/249; H01M 8/2483; H01M 8/0267; H01M 8/0488
See application file for complete search history.

(56) References Cited

U.S. PATENT DOCUMENTS

| | | | |
|---|---|---|---|
| 7,705,490 | B2 | 4/2010 | Srinivasan et al. |
| 7,974,106 | B2 | 7/2011 | Gurunathan et al. |
| 8,097,374 | B2 | 1/2012 | Gottmann et al. |
| 8,142,943 | B2 | 3/2012 | McElroy et al. |
| 8,563,180 | B2 | 10/2013 | Perry et al. |

(Continued)

*Primary Examiner* — Olatunji A Godo
(74) *Attorney, Agent, or Firm* — The Marbury Law Group PLLC

(57) ABSTRACT

A fuel cell system column includes a first terminal plate connected to a first electrical output of the column, a second terminal plate connected to a second electrical output of the column, at least one first fuel cell stack located in a middle portion of the column between the first terminal plate and the second terminal plate, and at least one electrical connection which is electrically connected to the middle portion of the column and which is configured to provide a more uniform fuel utilization across the first column.

18 Claims, 11 Drawing Sheets

(56) References Cited

U.S. PATENT DOCUMENTS

| | | |
|---|---|---|
| 8,617,763 B2 | 12/2013 | Armstrong et al. |
| 8,685,583 B2 | 4/2014 | Weingaertner et al. |
| 8,748,056 B2 | 6/2014 | Batawi et al. |
| 8,785,012 B2 | 7/2014 | Gottmann et al. |
| 8,785,074 B2 | 7/2014 | Edmonston et al. |
| 8,968,958 B2 | 3/2015 | Gottmann et al. |
| 8,993,191 B2 | 3/2015 | Fisher et al. |
| 9,065,127 B2 | 6/2015 | Gottmann et al. |
| 9,106,098 B2 | 8/2015 | Srinivasan et al. |
| 9,362,815 B2 | 6/2016 | Gurunathan et al. |
| 9,461,319 B2 | 10/2016 | Sudhan et al. |
| 9,461,320 B2 | 10/2016 | Ballantine et al. |
| 9,490,490 B2 | 11/2016 | Fisher et al. |
| 10,511,047 B2 | 12/2019 | Armstrong et al. |
| 10,809,308 B2 | 10/2020 | Ballantine et al. |
| 2008/0096080 A1 | 4/2008 | Batawi et al. |
| 2011/0183166 A1* | 7/2011 | Suga ............... H01M 50/543 |
| | | 429/61 |
| 2012/0098336 A1 | 4/2012 | Gurunathan et al. |
| 2012/0146587 A1 | 6/2012 | Srinivasan et al. |
| 2012/0196194 A1 | 8/2012 | Perry et al. |
| 2014/0087286 A1 | 3/2014 | Fisher et al. |
| 2016/0226085 A1* | 8/2016 | Kuribayashi ....... H01M 8/2425 |
| 2016/0254564 A1* | 9/2016 | Takeyama ......... H01M 8/04201 |
| | | 429/455 |
| 2017/0077535 A1 | 3/2017 | Sudhan et al. |
| 2020/0209317 A1 | 7/2020 | Ballantine et al. |
| 2020/0209318 A1 | 7/2020 | Ballantine et al. |

\* cited by examiner

FUEL CELL SYSTEM WITH ELECTRICAL CONTROL OF FUEL UTILIZATION AND METHOD OF OPERATING THEREOF

FIELD

The present disclosure is directed to fuel cell systems in general and to fuel cell systems with electrical control of fuel utilization in particular.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Many factors can influence the fuel utilization of a fuel cell stack or column, which is defined based on a ratio of output current to fuel input. For example, the fuel utilization of a fuel cell stack or column (in percent) may be provided by the following formula: Fuel Utilization (%)=100%*((Average Cell Current (in Amps)*Number of Cells)/F)/Fuel Available (in mol e⁻/sec), where F=Faraday's constant.

Fuel utilization essentially tracks the proportion of fuel that is actually converted by the fuel cells to electrical energy (i.e., output current or power). Fuel utilization in one part of a fuel cell stack or column may be different from fuel utilization in another part of the same fuel cell stack or column due to different local operating temperature, different fuel pressure drop and/or defects (e.g., cracks, electrode delamination, etc.) in one or more fuel cells in one part of a fuel cell stack or column than in another part.

SUMMARY

According to various embodiments, a fuel cell system column includes a first terminal plate connected to a first electrical output of the column, a second terminal plate connected to a second electrical output of the column, at least one first fuel cell stack located in a middle portion of the column between the first terminal plate and the second terminal plate, and at least one electrical connection which is electrically connected to the middle portion of the column and which is configured to provide a more uniform fuel utilization across the first column.

According to various embodiments, a method of operating a fuel cell system includes drawing a column current which flows in a first direction between a first terminal plate and a second terminal plate from at least one first fuel cell stack located in a middle portion of a first column between the first terminal plate and the second terminal plate, and at least one of drawing or providing at least one additional current from or to the middle portion of the first column to provide a more uniform fuel utilization across the first column.

DETAILED DESCRIPTION OF THE EXEMPLARY EMBODIMENTS

According to various embodiments, in addition to drawing column current from the terminal plates of the fuel cell column, additional current is drawn from (i.e., diverted from) and/or added to a middle portion of a fuel cell column, to provide a more uniform fuel utilization across the entire fuel cell column.

In a first embodiment, fuel cell columns may be electrically connected in a series-parallel configuration, where terminal plates of adjacent columns are electrically connected to each other and middle portions of the adjacent columns are electrically connected to each other. This configuration may provide a more uniform fuel utilization across each column if one of the columns contains one or more defective (e.g., damaged) fuel cells, which increase local resistance of one part of the column.

In a second embodiment, the fuel utilization in the central region of the fuel cell column may be higher than in one or both outer regions due to different column temperature and/or pressure drop of the fuel. In this embodiment, in addition to drawing current from the terminal plates of the fuel cell column, additional bypass current may be provided in the opposite direction to the central region of the fuel cell column and/or additional current may be drawn from the outer regions of the fuel cell column to make the fuel utilization more uniform across the entire length of the column (e.g., height for a vertically positioned column).

In a third embodiment, the fuel utilization at the top of a fuel cell column undergoing seal sintering may be higher than at the bottom of the column. In this embodiment, trim current electrical connections may be electrically connected along the length of the middle portion of the column to draw trim currents along the length of the column to provide a more uniform fuel utilization across the entire length of the column.

Figure 1:
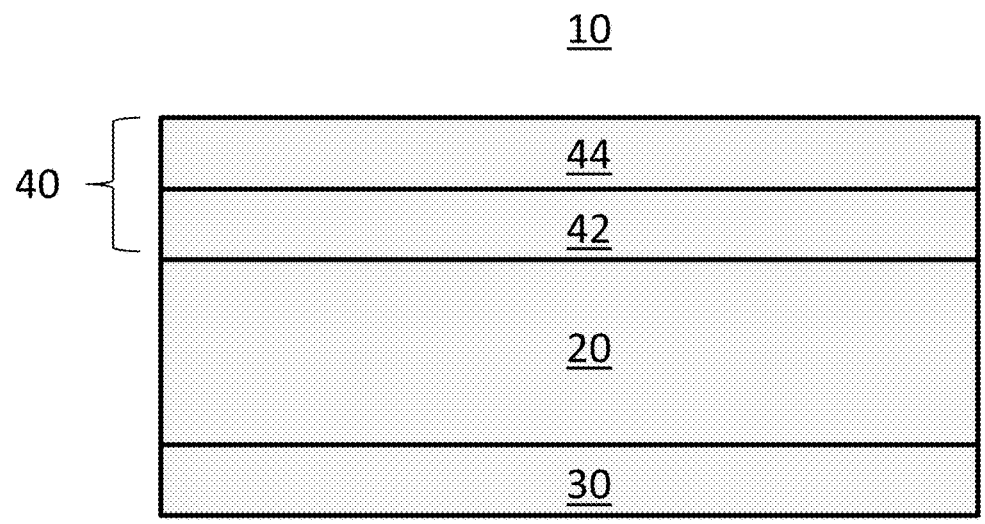
FIG. 1 is a side cross-sectional view of a fuel cell according to various embodiments of the present disclosure.

FIG. 1 illustrates an exemplary fuel cell 10, according to various embodiments of the present disclosure. Referring to FIG. 1, the fuel cell 10 may be a SOFC that contains an electrolyte 20 disposed between a cathode 30 (e.g., air electrode) and an anode 40 (e.g. fuel electrode). Additional contact or current collector layers (not shown for clarity) may be placed over the cathode 30 and anode 40, while additional interfacial layers, such as doped ceria interfacial layers, may be located between the electrodes 30, 40 and the electrolyte 20.

The electrolyte 20 may comprise an ionically conductive ceramic, such as doped zirconia (e.g., scandia and/or ceria stabilized zirconia), doped ceria, and/or any other suitable ionically conductive ceramic oxide material. The cathode 30 may include an electrically conductive material, such as an electrically conductive perovskite material, such as lanthanum strontium manganite (LSM). Other conductive perovskites may also be used.

The anode 40 may comprise at least one cermet that includes a metallic phase and a ceramic phase. The metallic phase may include a metal catalyst and the ceramic phase may include one or more ceramic materials. The metallic phase may be finely dispersed within the ceramic matrix of the ceramic phase, so as to limit damage that may occur if the metallic phase is oxidized.

The ceramic phase of the anode 40 may comprise any suitable ionically conductive ceramic material, such as a doped ceria and/or a doped zirconia. For example, the ceramic phase may include, but is not limited to gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), or the like. The metallic phase may include a metal catalyst, such as nickel (Ni), cobalt (Co), copper (Cu), alloys thereof, or the like, which operates as an electron conductor. The metal catalyst may be in a metallic state or may be in an oxide state.

The anode 40 may be an oxidation-tolerant electrode having a functionally graded configuration. For example, as shown in FIG. 1, the anode 40 may include a first layer 42 disposed on the electrolyte 20, and a second layer 44 disposed on the first layer 42. The first layer 42 may be disposed closer to the electrolyte 20 than the second layer 44. The first layer 42 may be configured to electrochemically oxidize a fuel. The second layer 44 may be configured for electron conduction and may operate as a reforming catalyst. The second layer 44 may have a higher porosity and a higher metal to ceramic ratio than the first layer 42. The first and second layers 42, 44 may each include a cermet including a metallic phase and a ceramic phase, as described above. The metallic phases and/or the ceramic phases of the first and second layers 42, 44 may include the same or different materials. In some embodiments, one of both of the first and second layers 42, 44 may include only a single phase. For example, the second layer 44 may include a metallic phase and the ceramic phase may be omitted.

The fuel cell 10 may be an electrolyte supported cell manufactured by forming the cathode 30 on a first side of the electrolyte 20, and forming the anode 40 on a second side of the electrolyte 20, using screen printing, inkjet printing, or other suitable methods, as disclosed in U.S. Pat. No. 8,617, 763, which is incorporated herein by reference in its entirety. The anode and cathode inks are then fired (i.e., sintered) to form the anode and cathode electrodes.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

Figure 2:
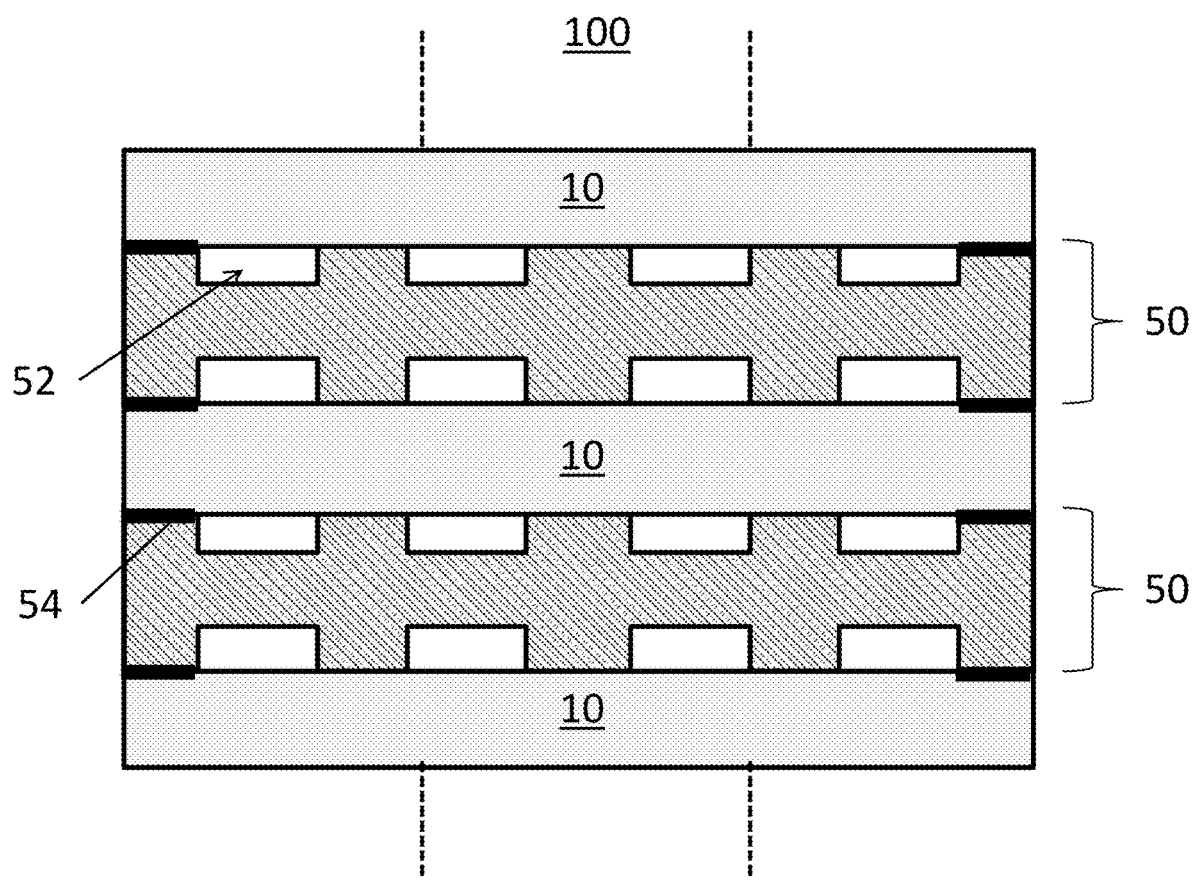
FIG. 2 is a side cross-sectional view of a portion of a fuel cell stack according to various embodiments of the present disclosure.

FIG. 2 illustrates a side cross-sectional view of a fuel cell stack 100 according to various embodiments of the present disclosure. Referring to FIG. 2, the stack 100 includes fuel cells 10 of FIG. 1 stacked on one another and separated by interconnects 50. The interconnects 50 include flow channels 52 configured to provide fuel and air to the respective anodes 40 and cathodes 30 of the fuel cells 10. The interconnects 50 may also operate to electrically connect the fuel cells 10 in series. Glass or glass ceramic seals 54 may be located between adjacent fuel cells 10 and interconnects 50 in the fuel cell stack 100. Interconnects 50 shown in the embodiment of FIG. 2 have cathode and anode flow channels 52 that are parallel to each other. In an alternative embodiment, the cathode and anode flow channels 52 may be perpendicular to each other, leading to cross flow.

Figure 3:
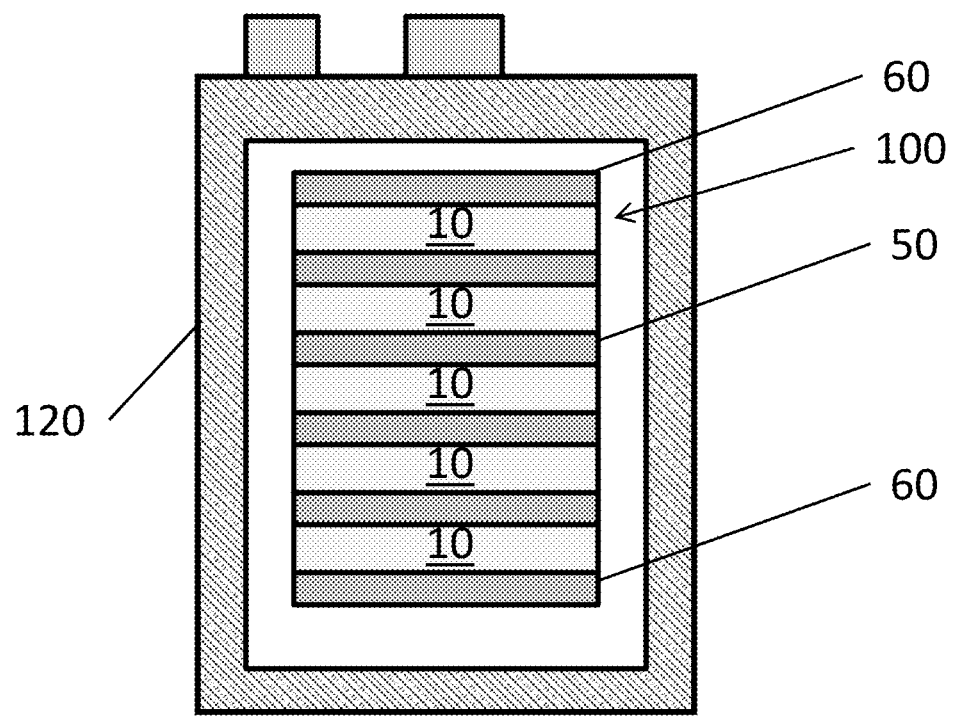
FIG. 3 is a schematic side cross-sectional view of a hotbox of a fuel cell system, according to various embodiments of the present disclosure.

FIG. 3 illustrates a schematic side cross-sectional view of a fuel cell system hotbox 120 including the stack 100 of FIG. 2, according to various embodiments of the present disclosure. Referring to FIG. 3, the hotbox 120 is shown to include the fuel cell stack 100. However, the hotbox 120 may include two or more of the stacks 100 and two or more columns of stacks. The stack 100 may include the electrically connected fuel cells 10 stacked on one another, with the interconnects 50 disposed between the fuel cells 10, and end plates 60. The hotbox 120 may include other components, such as fuel conduits, air conduits, seals, electrical contacts, heat exchangers, tail gas oxidizers, etc., and may be incorporated into a fuel cell system including balance of plant components. The interconnects 50 and/or end plates 60 may comprise any suitable gas impermeable and electrically conductive material, such as a metal or metal alloy (for example, a Cr—Fe alloy including 4-6 wt % Fe, 0-1 wt % $Y_2O_3$, and a balance of Cr). The interconnects 50 electrically connect adjacent fuel cells 10 and provide channels for fuel and air to reach the fuel cells 10.

Figure 4A:
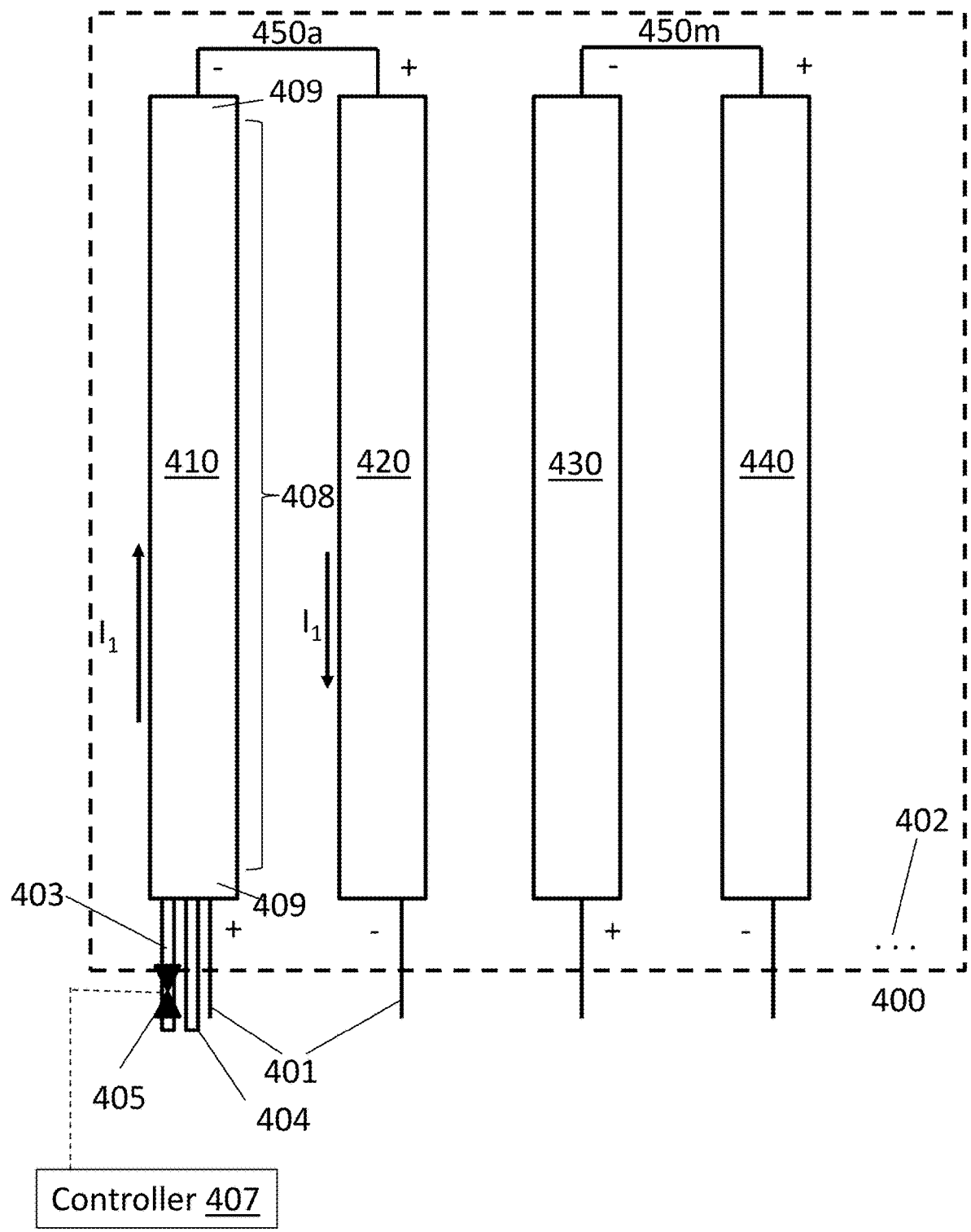
FIG. 4A is a schematic side cross-sectional view of a multiple-column fuel cell system according to various aspects of the present disclosure.

FIG. 4A shows a four column system 400 that may provide power from fuel cell stacks 100. Although four columns are shown in FIG. 4A, is to be understood that any suitable number of columns may be included in the system 400, such as two to twenty, such as eight to ten. FIG. 4A represents columns 410, 420, 430, and 440 schematically.

Each of the columns may include one or more fuel cell stacks 100, such as SOFC stacks 100 shown in FIG. 3 and/or other types of fuel cells.

As shown in FIG. 4A, each column has an electrical output (e.g., lead wire or rod) 401 connected to a terminal plate of the column. The electrical output 401 is electrically connected to input/output circuitry, such as DC/DC converter(s) and/or inverter(s), which are in turn electrically connected to the electrical load powered by the system 400. Ellipses 402 after column 440 indicates that a number of columns greater than four may be utilized. Column 410 includes a fuel intake (e.g., fuel inlet conduit (e.g., pipe)) 403 controlled by a fuel valve 405 and a fuel exhaust (e.g., fuel outlet conduit (e.g., pipe)) 404, which may be present in each column 410, 420, 430, and 440. FIG. 4A omits additional intakes and exhausts for the sake of simplicity. A middle portion 408 of the column is located between the end (i.e., terminal) portions 409 of the columns which contain the terminal plates.

FIG. 4A shows two electrical connections (i.e., electrical connectors, such as conductive wire or rod jumpers) 450a and 450m connecting two respective pairs of columns in series. More specifically, terminal plates of columns 410 and 420 are connected via a connection 450a to form a first fuel cell column electrical segment (410, 450a, 420). An electrical segment contains two electrical outputs 401 (i.e., one positive and one negative electrical output) which are electrically connected to input/output circuitry of the system 400. The column current $I_1$ in the columns and segments typically flows from the positive electrical output 401 to the negative electrical output 401.

Columns 430 and 440 may be connected via connection 450m to form a second fuel cell column electrical segment (430, 450m, 440). In the series configuration created by connections 450a and 450m, a fault in a stack 100 (e.g., one or more defective fuel cells, etc.) of any one of the columns 410-440 could cause a failure of the entire electrical segment.

Figure 4B:
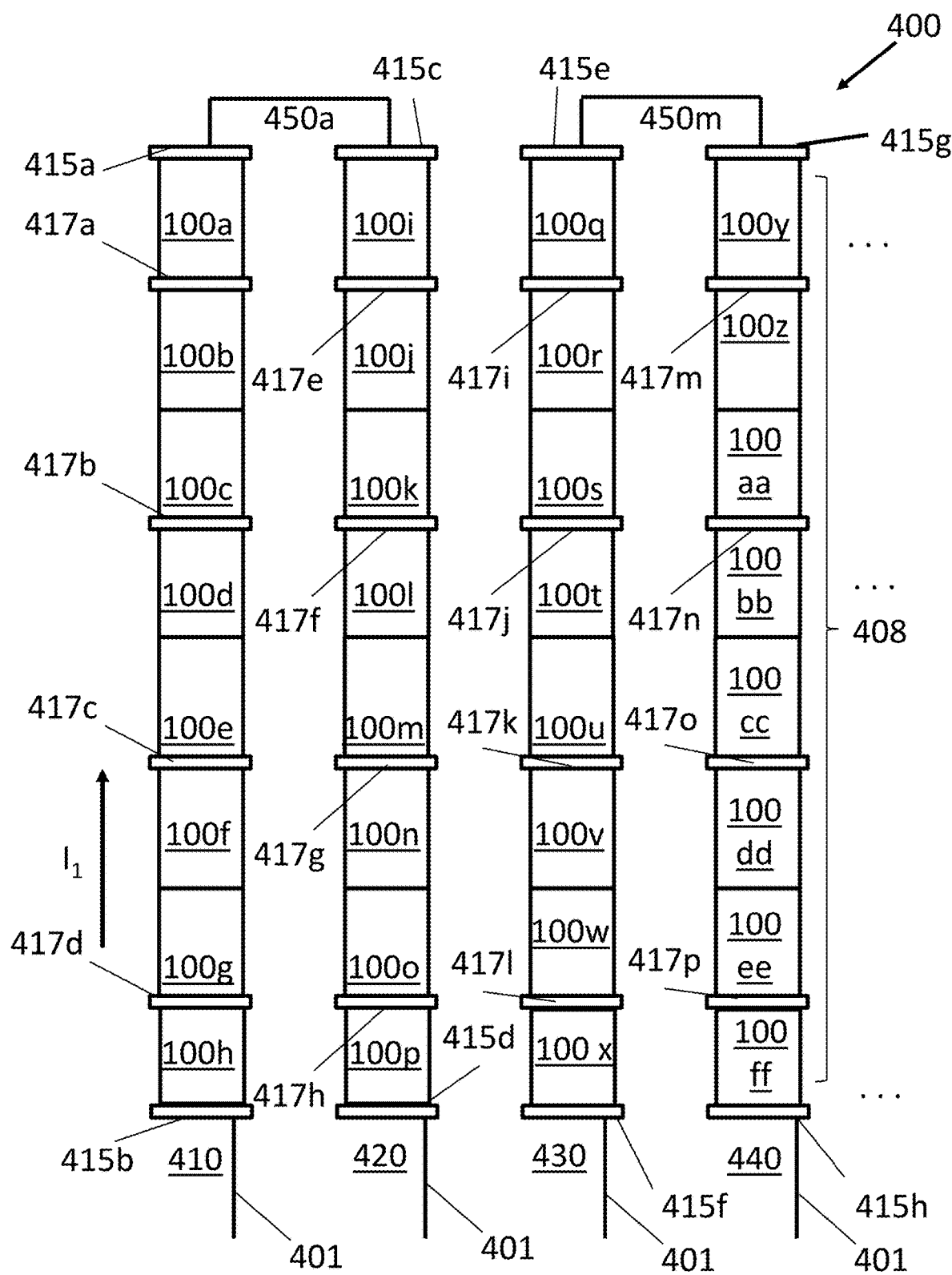
FIG. 4B is a schematic side cross-sectional view of details of the interconnection between the columns of the system in FIG. 4A.

FIG. 4B shows the system 400 of FIG. 4A with enhanced detail, i.e., showing the location each individual stack 100a-100ff in the respective columns 410-440, as well as exemplary terminal plate 415 and fuel manifold 417 locations in each column. Each fuel manifold 417 may be connected the respective fuel intake (e.g., fuel inlet conduit) 403 and fuel exhaust (e.g., fuel outlet conduit) 404 for each column, and may distribute the fuel to and from overlying and underlying fuel cell stacks 100 in each column. For example, each fuel manifold may comprise an electrically conductive (e.g., metal or metal alloy) anode splitter plate described in U.S. Pat. No. 10,511,047 B2, issued on Dec. 17, 2019 and incorporated herein by reference in its entirely.

In system 400, each column 410-440 includes eight stacks 100 and four fuel manifolds 417. For example, column 410 contains stacks 100a to 100h, fuel manifolds 417a to 417d, and terminal plates 415a and 415b located at opposing ends of the column. However, it is to be understood that the number of stacks per column in FIG. 4B is merely illustrative. Principles discussed herein may apply to columns with any suitable number of stacks, such as 2 to 20 stacks, for example 10 to 12 stacks. Furthermore, more or less than four fuel manifolds 417 per column may be used. Alternatively, the fuel manifolds 417 may be omitted. Stacks 100a-100ff may all be the same type. For example, the stacks may all be SOFC stacks. Alternatively, stacks 100 may include other types of fuel cell stacks.

In the first embodiment of the present disclosure, the present inventors realized that one damaged (e.g., defective or broken) fuel cell in one stack may have a significantly increased electrical resistance to drive the segment voltage to a level low enough such that the entire hot box containing plural segments is shut down for service to replace the damaged fuel cell. One way to increase the reliability and robustness of the hot box is to electrically connect the stacks and/or columns in a series-parallel configuration, as shown in FIG. 4C.

Figure 4C:
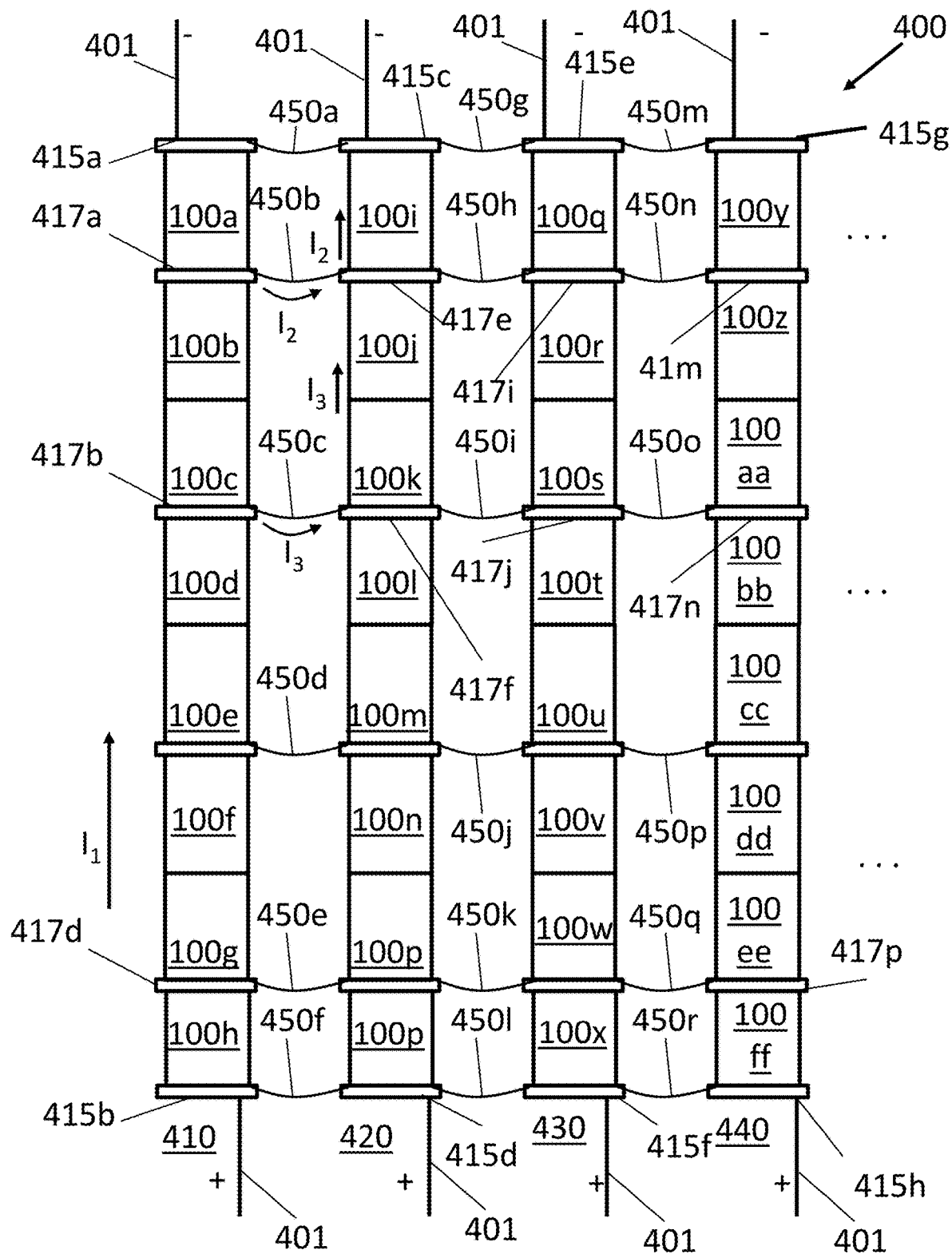
FIG. 4C is a schematic side cross-sectional view of series-parallel wiring scheme of the columns in FIGS. 4A and 4B according to a first embodiment of the present disclosure.

As shown in FIG. 4C, the terminal plates 415a-415h located at the same level (i.e., at the same end) of adjacent columns 410-440 may be electrically connected to each other by respective electrical connections 450a, 450f, 450g, 4501, 450m, and 450r. Furthermore, the fuel manifolds 417a-417 located at the same level (i.e., at the height) of adjacent columns 410-440 may be electrically connected to each other by respective electrical connections 450b, 450c, 450d, 450e, 450h, 450i, 450j, 450k, 450n, 450o, 450p, and 450q. The electrical connections (e.g., jumper wires or rods) are configured redirect current away from stacks 100a-100ff that are functioning at limited efficiency (e.g., which contain a damaged fuel cell or another defect) to reduce the problems discussed above.

For example, if all the columns are aligned in the same direction (e.g., positive end or negative end on top of each column) and have a respective positive and negative electrical outputs 401 on opposite ends of the column, then each column becomes an electrical segment. For example, if there are eight segments/columns in the hot box, then the fuel manifolds 417 at the same level (e.g., at the same height) of all the adjacent columns are electrically connected to each other with respective electrical connections (e.g., conductive wire or rod jumpers) 450 as shown in FIG. 4C. If the fuel manifolds 417 are omitted or do not lend themselves to convenient electrical connection, then the end plates of each stack 100 of all adjacent columns are electrically connected with each other at the same level.

In this embodiment, if a fuel cell started going bad (e.g., being damaged by developing a crack or electrode delamination over time) in a stack 100, then the current would be redirected to the adjacent stacks 100 in the other columns. Even in the worst case scenario, if the fuel cell damage increases to the point that the electrical resistance of the fuel cell becomes so high that essentially no current can be conducted through the fuel cell, then the entire column/segment voltage is redistributed to the remaining columns/segments in the hot box.

For example, if the preset column/segment current is 21 Amperes (A) in a hot box containing 8 columns/segments which are designed to operate at a designed average fuel utilization (e.g., a value between 70 and 95%), and one column/segment stops conducting current at the point of the damaged fuel cell, then the 21 A is redistributed to the 7 remaining columns by the electrical connections which are connected in parallel. Thus, the current drawn from each of the 7 remaining columns is increased by only 3 A (i.e., 21/7), which is a manageable increase.

The system 400 controller 407 is configured to detect the increase in output current for each column/segment, and to increase the fuel flow rate to each column/segment in the hot box (e.g., global fuel supply) to maintain the system at the same average fuel utilization as the designed average fuel utilization.

Alternatively, instead of electrically connecting each column as a separate electrical segment with independent electrical outputs 401 at each end, the columns may be connected in pairs to form a segment with each column having only one electrical output 401 (e.g., at the bottom end), as shown in FIG. 4A. In this alternative embodiment, the hot box may contain 4 segments (each containing two columns) The fuel manifolds 417 of the adjacent "odd" columns (e.g., columns with the negative electrical output 401) are electrically connected to each other in the same column level. Furthermore, the fuel manifolds 417 of the adjacent "even" columns (e.g., columns with the positive electrical output 401) are electrically connected to each other in the same column level to obtain a similar benefit.

During the operation of the system with the series-parallel connected columns shown in FIG. 4C, as the amount of damage to the damaged fuel cell increases over time and the damaged fuel cell electrical resistance increases, the current is automatically redistributed from the first column containing the damaged fuel cell to other columns in the hot box connected in parallel to the first column. This results in a reduction in the magnitude of electrical current in the stack containing the damaged fuel cell. The reduced current decreases the degradation/damage rate of the damaged fuel cell over time, thus avoiding or delaying the complete failure of the damaged fuel cell. Therefore, it is not necessary to reduce the output current for the entire hot box to reduce stress on the damaged fuel cell when a damaged fuel cell is detected.

In a series-parallel configuration of FIG. 4C, the current is reduced only for the stack or stack pair containing the damaged fuel cell. For example, if the damaged fuel cell is located in stack 100a of column 410 in FIG. 4C, then the column current $I_1$ is reduced only for stack 100a due to the increase in the resistance of the damaged fuel cell, since the bypass current $I_2$ flows through manifolds 417a and 417e and the parallel electrical connection 450b to parallel stack 100i in adjacent column 420.

In another example, if the damaged fuel cell is located in stack 100b in column 410, then the current is reduced only for the stack pair 100b and 100c located between adjacent fuel manifolds 417a, 417b, which are electrically connected to respective fuel manifolds 417e, 417f at the same levels (e.g., height) in the adjacent column 420. In this case, the bypass current $I_3$ flows through manifolds 417b and 417f and the parallel electrical connection 450c to parallel stack 100k in adjacent column 420.

Thus, the reduced current in the stack 100a or stack pair 100b, 100c containing the damaged fuel cell reduces the stress on the this stack or stack pair, without reducing the global current output of the hot box and therefore only negligibly affecting hot box output power. For example, if the current set point for the hot box is 21 A, then in the initial stages of the fuel cell damage, the increased resistance of the damaged fuel cell may lead to a stack or stack pair current reduction to 19A. Thus, only 2 A of current is redistributed to the other 7 columns.

In the series-parallel configuration of FIG. 4C, the system controller 407 (shown in FIG. 4A for clarity) monitors and controls the fuel utilization by controlling the fuel inlet valve 405 in order to prevent starvation of fuel cell stacks 100 or pairs of adjacent columns that may be operating at higher than average (or setpoint) currents by increasing the fuel flow rate through the fuel intake 403. Thus, with monitoring of row level voltages (i.e., the voltages of stacks between a termination plate and next fuel manifold, or voltages of stack pairs between adjacent fuel manifolds) by the system controller, the global fuel utilization can be adjusted to accommodate the stacks or stack pairs operating at a higher than average or setpoint current. Furthermore, if stack or stack pair starts to run at a higher than setpoint fuel utilization (i.e., at a higher current for same input fuel rate), then the resulting increase in Rp resistance should lead to current reduction on that particular stack or stack pair. Thus, there is a degree of self-adjustment to generate a more uniform current and fuel utilization among the stacks and columns in the hot box. Thus, the series-parallel connection of FIG. 4C may increase the reliability of the fuel cell system and mitigate the effects of fuel cell damage.

The series-parallel electrical connection between stacks of adjacent columns and/or segments takes advantage of the non-linearity of the damaged fuel cell resistance and fuel cell lifetime. More specifically, a slight reduction in current through the stack containing the damaged fuel cell due to an increase in cell resistance will automatically increase the lifetime of that fuel cell. The temperature will be lower due to the lower current and lower air and fuel utilization, which also acts to decrease the current. This combination is expected to give sufficient reduction in current to improve the lifetime of the fuel cell, and to provide a more uniform fuel utilization among the columns and/or segments.

Figure 5A:
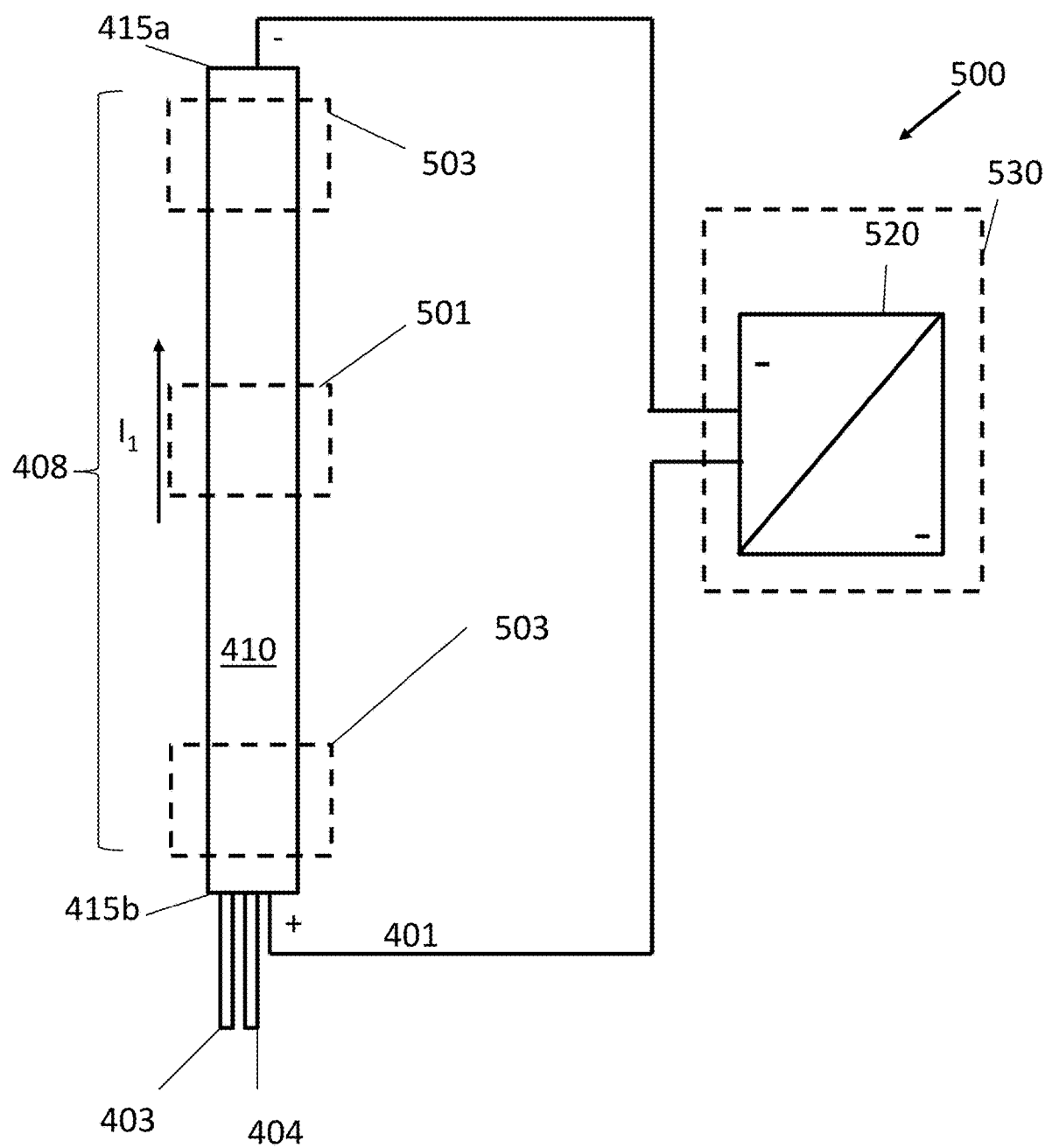
FIG. 5A is a schematic side cross-sectional view of a single column in a multiple-column fuel cell system.
Figure 5B:
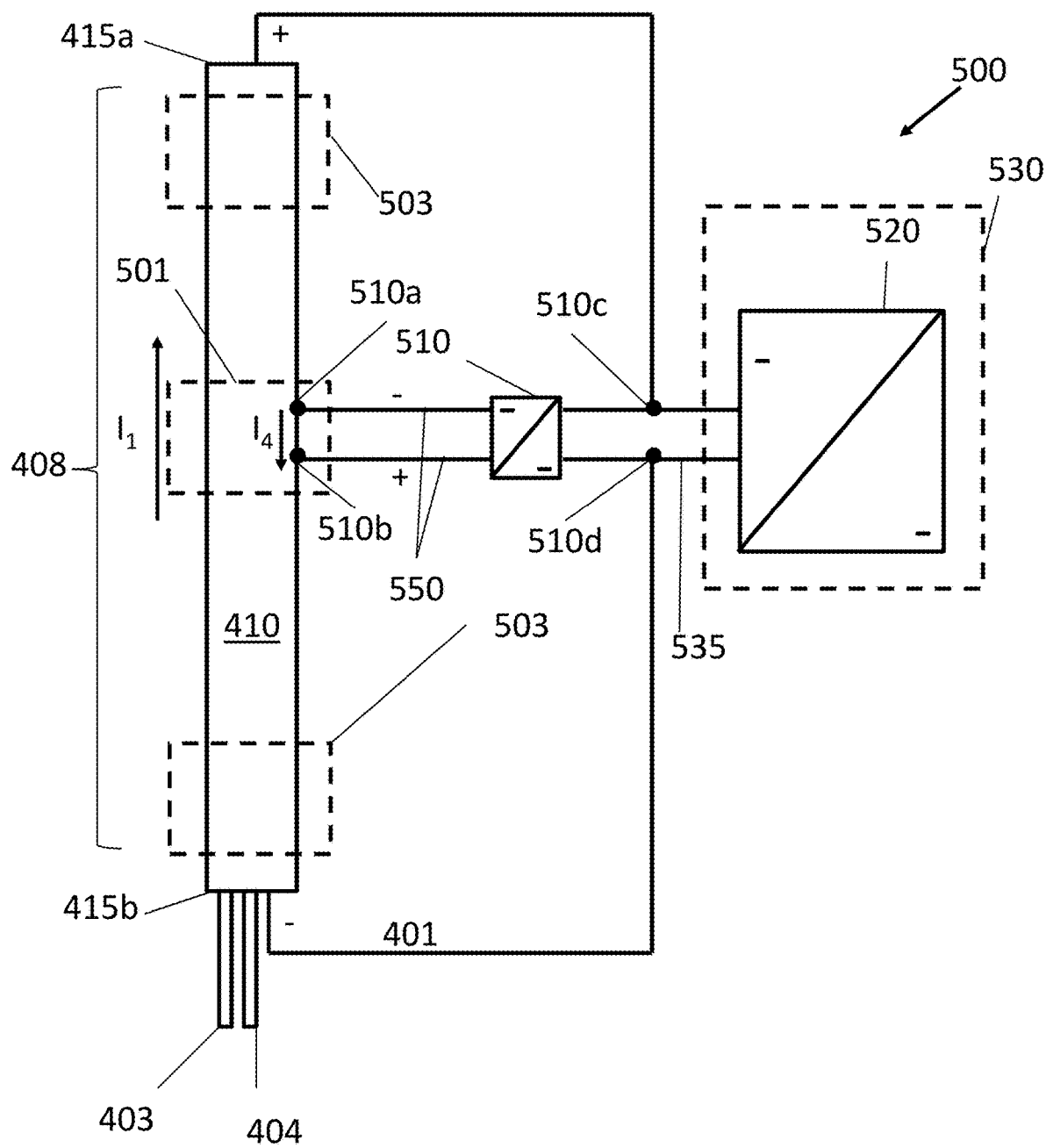
FIG. 5B is a schematic side cross-sectional view of configuration of the system of FIG. 5A for bypassing or drawing current from a portion of a column according to a second embodiment of the present disclosure.
Figure 5C:
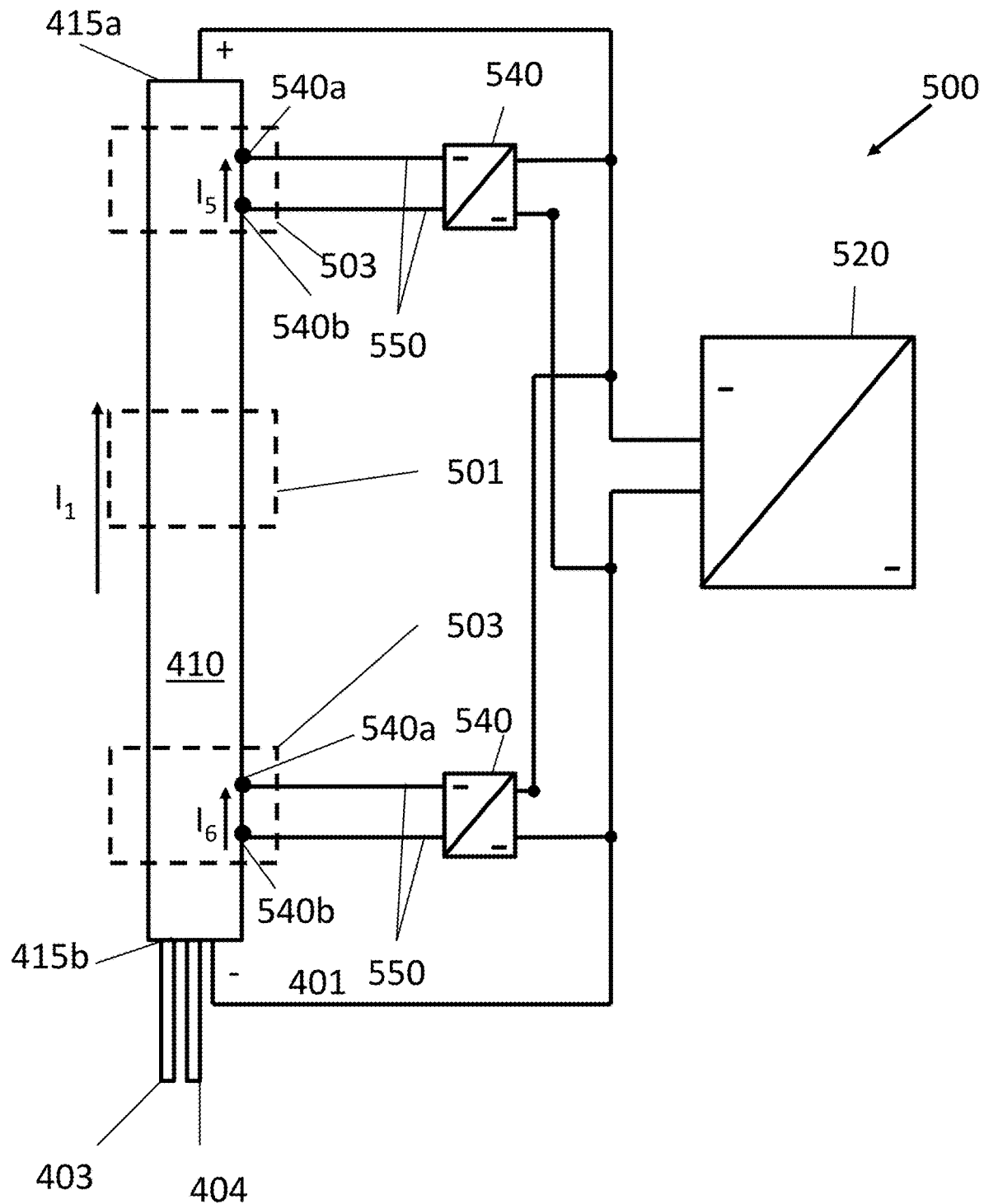
FIG. 5C is a schematic side cross-sectional view of a configuration of the system of FIG. 5A for adding current to portions of a column according to an alternative aspect of the second embodiment of the present disclosure

FIGS. 5A-5C illustrate a second embodiment of the present disclosure in which current is drawn from and/or provided to a middle of a fuel cell stack column to provide a more uniform fuel utilization along the length of the entire column.

FIG. 5A shows column 410, such as a column of SOFC stacks 100, electrically connected to the DC/DC converter 520 of an input/output circuit 530 in a system 500. The column 410 provides a column current $I_1$ to the DC/DC converter 520. That is, current $I_1$ is the current from all stacks 100 in column 410 that flows from the positive terminal plate 415b to the negative terminal plate 415a. It should be noted that column 410 may be part of a segment (410, 450a, 420) shown in FIG. 4A that is electrically connected to the input/output circuit 530 as a distinct electrical entity. However, the rest of the segment is not shown in FIG. 5A for simplicity.

The column 410 contains regions which have relatively higher and relatively lower fuel utilization because of temperature and/or fuel pressure drop differences. For example, the middle portion 408 of the column 410 may include a central region 501 located between two outer regions 503. Each outer region 503 is located between the central region and a respective terminal plate 415a, 415b located on the end of the column 410. Thus, all regions 501, 503 are located in the middle portion 408 of the column 410, which is different from the end (i.e., terminal) portions 409 which include the terminal plates 415a, 415b on opposite ends of the middle portion of the column 410. Each region 501, 503 may include one or more fuel cell stacks 100 or a portion of one stack 100. For example, the central region 501 may extend along 10 to 50 percent of the length of the column 410. Each outer region 503 may extend along 10 to 40 percent of the length of the column 410.

The central region 501 may operate at a higher temperature than the outer regions 503. Therefore, the fuel cells in the central region 501 operate at a higher fuel utilization than the fuel cells in the outer regions 503. The result of this is that the entire column (and entire segment) is operated at a fuel utilization of a fuel fraction such that all portions of all fuel cells in the column are provided the necessary fuel to avoid fuel starvation. This means that some fuel cells are operating at a fuel utilization which is lower than what they could possibly support, which decreases the system 500 efficiency.

In a first aspect of the second embodiment shown in FIG. 5B, a relatively small bypass current $I_4$ is routed around sets of fuel cells (e.g., part of a stack 100 or one or more entire stacks 100) located in the central region 501 which operate naturally with a higher fuel utilization. The result of this is that the fuel utilization is locally reduced for these fuel cells in the central region 501. This leaves room to raise the overall fuel utilization for the column 410, which improves the system 500 efficiency.

Specifically, an additional DC/DC converter 510 is electrically connected to the central region 501 to provide a bypass current $I_4$ flowing in the opposite direction of the column current $I_1$. DC/DC converter 510 provides the bypass $I_4$ to fuel cells within the central region 501. For example, the DC/DC converter 510 contains electrical connections 550 (e.g., electrical connectors such as wires or rods) which contain electrical output terminals 510*a*, 510*b* which are electrically connected to respective fuel manifolds 417, stack end plates 60 and/or even interconnects 50 located at boundaries of the central region 501.

The absolute magnitude of the bypass current $I_4$ may be smaller than the absolute magnitude of the column current $I_1$, for example, smaller by at least 50%. In one embodiment, the absolute magnitude of the bypass current may be 2 to 20 times smaller than the absolute magnitude of the column current. For example, if the column current is set to 20 A, then the bypass current may be set to −1 A to −10 A. Alternatively, if the column current is set to −20 A, then the bypass current may be set to 1 A to 10 A. The bypass current may be set to reduce the fuel utilization in the central region 501 to a desired value. The setting of the bypass current provided by the additional DCDC converter 510 may be adjusted based on one or more of AC impedance data (i.e., the results of AC electrochemical impedance testing of the column or stack(s)), time in life of the column and/or specific properties of each column.

In one embodiment, the additional DCDC converter 510 may be electrically connected to one or more than one columns in the hot box of the system 500. For example, the additional DCDC converter 510 may be connected to the central regions 501 of all columns in the hot box of the system 500.

In one embodiment, the additional DCDC converter 510 may include electrical input contacts 510*c*, 510*d*, which are electrically connected to the main output DC bus 535 (e.g., a +/−380V DC bus) of the system 500. The main output DC bus 535 electrically connects the terminal plates 415 of the columns to the main DC/DC converter 520 of the input/output circuit 530 of the system 500. The additional DCDC converter 510 may draw electrical power (i.e., direct column current $I_1$) from the main output DC bus 535, reverse the direction of the drawn current, and provide the bypass current $I_4$ to the central region 501 of the column 410 via the electrical output terminals 510*a*, 510*b*. Alternatively, the additional DCDC converter 510 may draw power from another source, such as a battery or capacitor located in the system 500.

In an alternative aspect of the second embodiment shown in FIG. 5C, one or more additional DC/DC converters 540 may draw additional current from the outer portions 503 of the column 410 in addition or instead of providing the bypass current to the central region 501. The increase in drawn current from the outer portions 503 increases the fuel utilization from the outer portions 503, to make the fuel utilization more uniform along the entire length of the column 410.

Specifically, FIG. 5C shows two additional DC/DC converters 540 electrically connected to the outer regions 503 of the column 410 via electrical connections (i.e., electrical connectors, such as wires or rods) 550 containing respective terminals 540*a* and 540*b*. The additional DC/DC converters 540 may also be electrically connected to the main output bus 535.

DC/DC converters 540 provide an alternative way of addressing the uneven fuel utilization problem discussed above. Both DC/DC converters 540 draw additional currents $I_5$, $I_6$ from respective outer regions 503 of the column 410. The additional currents $I_5$, $I_6$ flow in the same direction as the column current $I_1$. However, the additional currents $I_5$, $I_6$ have a smaller absolute magnitude than the column current $I_1$, for example, smaller by at least 50%. In one embodiment, the absolute magnitude of the additional current may be 2 to 20 times smaller than the absolute magnitude of the column current. Furthermore, while separate additional DC/DC converters 540 are shown as drawing the additional currents, in another aspect, a single additional DC/DC converter may be used to draw the additional currents from the outer regions 503 of the column 410. As noted above, the additional currents drawn from the outer regions 503 may be used without providing the bypass current to the central region 501 or in combination with providing the bypass current to the central region 501.

Figure 6:
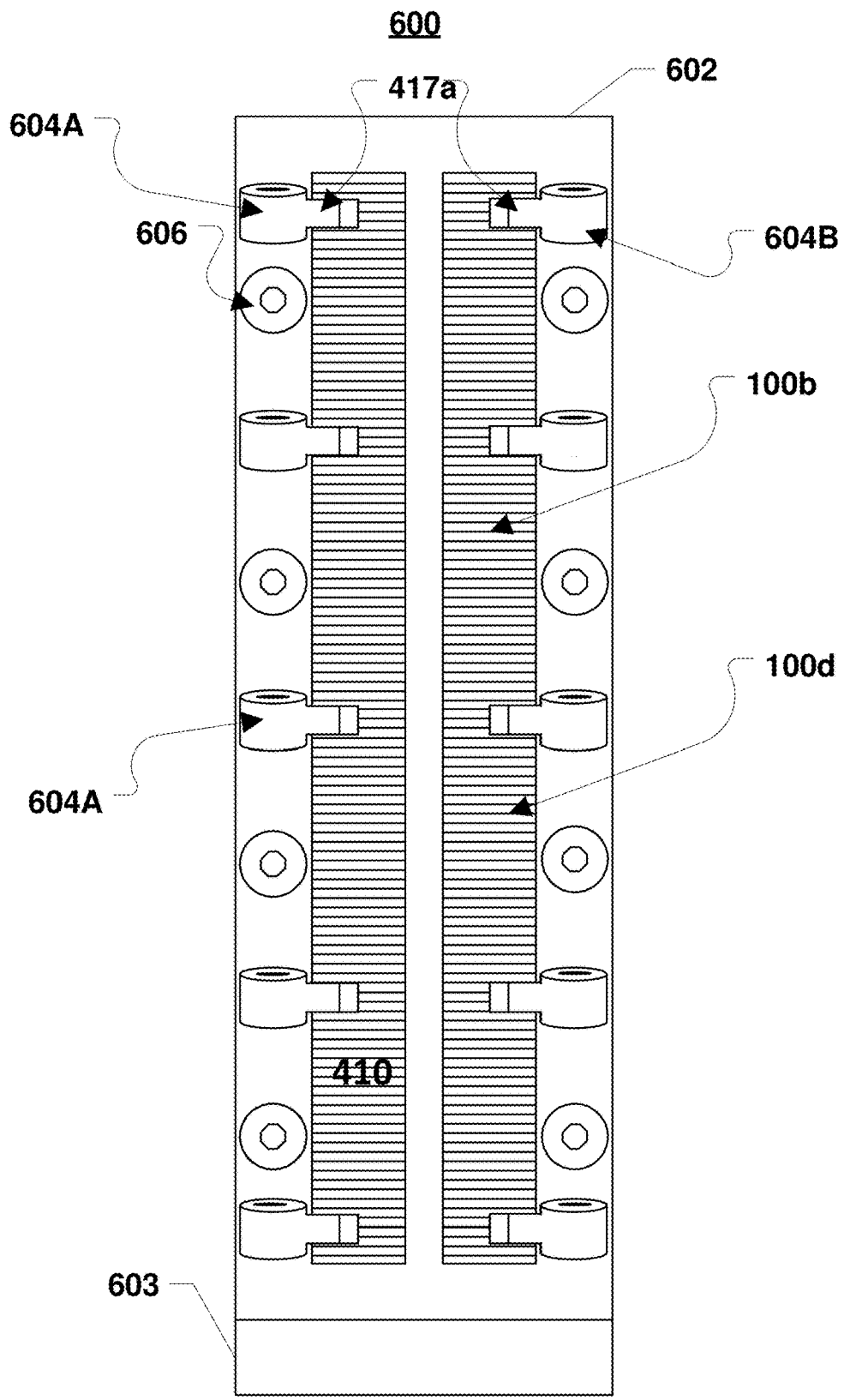
FIG. 6 is a perspective view of a fuel cell column undergoing sintering and conditioning in a channel guide.
Figure 7:
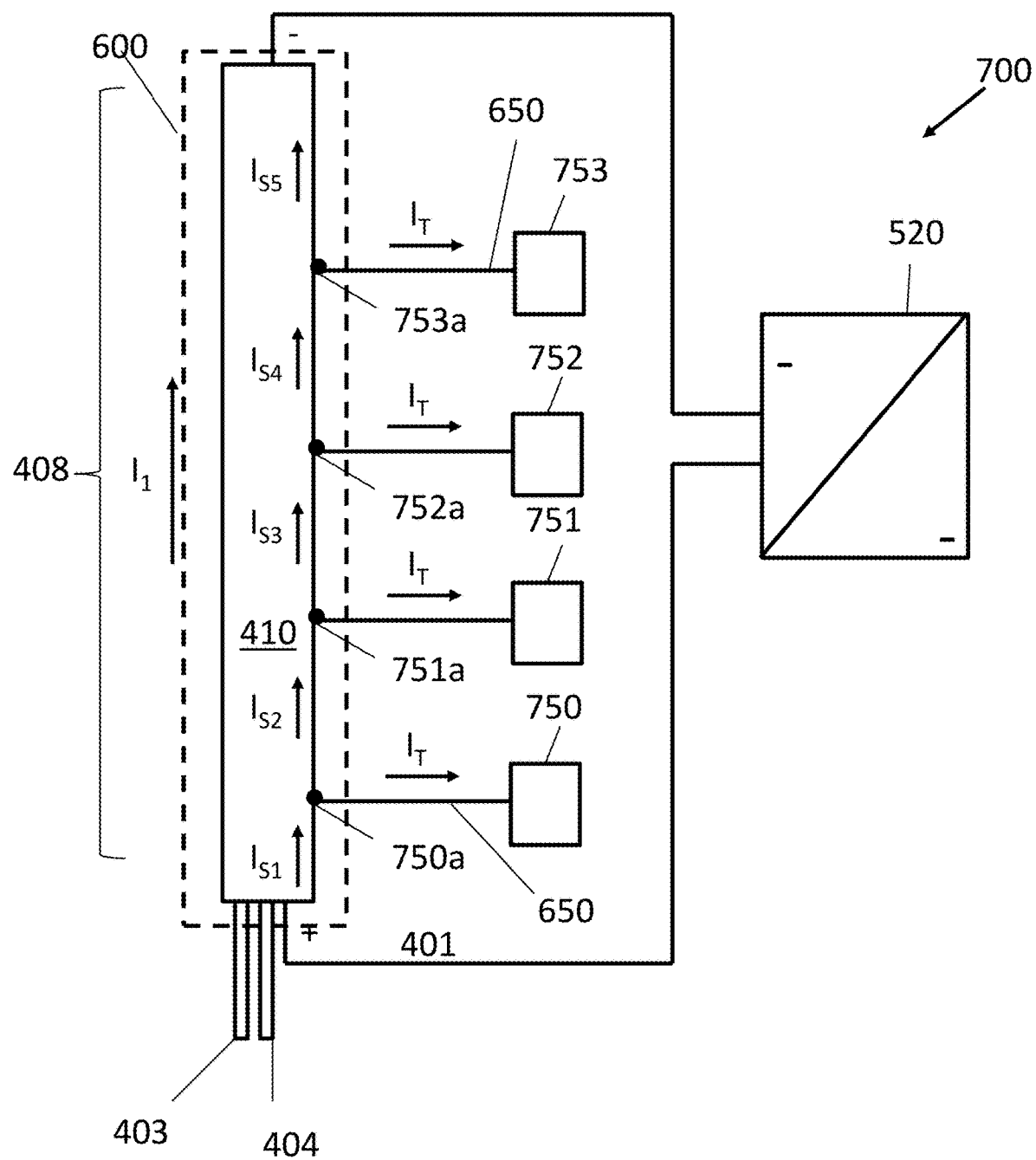
FIG. 7 is a schematic side cross-sectional view of a single column located in the channel guide and containing trim current electrical connections, according to the third embodiment.

In the third embodiment of the present disclosure illustrated in FIGS. 6 and 7, the column fuel utilization uniformity is improved during column sintering and conditioning (i.e., during manufacturing) by drawing additional current from the middle portion 408 of the column.

FIG. 6 illustrates the column 410 including plural fuel cell stacks 100 (e.g., 100*b*, 100*d*, etc.) and fuel manifolds 417 (e.g., 417*a*, etc.) located in channel guide 600 that is suitable for sintering the seals 54 in the column 410. The channel guide 600 and the column 410 sintering process are described in more detail in U.S. Pat. No. 9,065,127 (the "'127 Patent"), herein incorporated by reference in its entirety. The channel guide contains ceramic channel guide rails 602 which hold the column 410 in place on a manifold base 603. The manifold base 603 may provide fuel conduits for providing fuel inlet and exhaust streams to and from the column 410. Ceramic bolts or tie rods 606 may be used to clamp the channel guide rails 602 together around the column 410.

The fuel manifolds 417 may include protruding fuel feed/return assemblies configured to input fuel into a feed port 604A and export fuel from an exhaust port 604B. Fuel is provided to the feed ports 604A of the fuel manifolds 417 and fuel exhaust is removed from the exhaust ports 604B during the sintering process. The fuel manifolds 417 may separate adjacent fuel cell stack(s) 100 and provide fuel into fuel cell stacks located above and below the fuel manifolds 417. In an embodiment, the channel guide 600 may be suitable for sintering a column 410 containing any number of fuel cell stack(s) 100, such as 1-10 fuel cell stack(s) 100 containing at total of 25-250 cells, or any number in between, at a temperature greater than 900 degrees Celsius (e.g., 950-1000 degrees Celsius) in air or inert (e.g., $N_2$) ambient. Channel guide rails 602 may prevent stack tilting and shifting when the stack seals 54 (e.g., glass or glass ceramic seal located between the interconnects 50 and the fuel cells 10 in each stack 100, as shown in FIG. 2) melt during sintering.

The present inventors realized that the fuel utilization at the top of the column 410 may be higher than at the bottom of the column due to the fuel pressure drop and/or a temperature difference during the sintering. Lower than desired fuel utilization at the bottom of the column 410 can mask some manufacturing defects and effectively eliminate fuel utilization sensitivity as a diagnostic technique during the sintering process.

FIG. 7 shows system 700 in which additional electrical connections (i.e., electrical connectors, such as conductive wires or rods) 650 are attached along the middle part of the column 410 to draw trim currents to even out the fuel utilization profile along the length of the column 410 undergoing seal sintering in the channel guide 600 (which is shown schematically by the dashed lines in FIG. 7). For example, for a column 410 containing 250 fuel cells, the electrical connections 650 may be thin wires or contactors attached to interconnects, end plates and/or fuel manifolds at cells number 50, 100, 150 and 200 in the column 410. This raises the fuel utilization at the bottom of the column 410, since the column current L is highest at the bottom of the column 410, and is lowest at the top of the column 410 due to the drawing of the trim currents.

FIG. 7 shows components 750-753 connected to column 410 via respective electrical connections 650 at points 750a-753a, respectively, in order to draw trim currents ($I_T$) from column 410 to lower the fuel utilization at the top of column 410. Components 750-753 may comprise electrical loads (e.g., resistors, capacitors, or power storage devices) and/or power electronic components, such as additional DC/DC converters. More specifically, extracting the $I_T$ at various points along the column 410 ensures that the section current ($I_{SS}$) portion of the column current $I_1$ near the top of the column 410, where fuel utilization is highest, is lowered with respect to the section current ($I_{S1}$) portion of the column current $I_1$ near the bottom of the column 410, where fuel utilization is lowest.

For example, $I_1$ might represent a set column current of 20 to 40 A and $I_T$ may comprise a trim current of 0.1 to 1 A, such as 0.3 to 0.5 A (e.g., 0.025 to 0.5% of the column current). In that case, each of the section currents would be successively decreased by 0.1 to 1 A. In other words, the section currents would gradually decrease from bottom to top of the column 410, lowering the fuel utilization at the top of column 410. It is to be understood that the magnitude of $I_T$ may be tuned to reach a desired fuel efficiency at any point in the column 410, including the top. Although FIG. 7 shows current of magnitude $I_T$ being drawn by each of components 750-753, each component components 750-753 may draw a different current.

In one aspect of the third embodiment, certain regions of the column 410 may receive additional current by connecting additional electrical connections 650 (e.g., additional wires) to the first and last interconnect of these regions to support stress testing. It is often desirable to compare how cells within the same stack or column react to additional or different stresses. For example every second fuel cell in a column 410 may have two additional wires attached to the respective interconnects overlying and underlying the respective fuel cell under test. Each pair of wires is electrically connected to a current controller or a resistor. During the stress testing, every second fuel cell (e.g., every odd fuel cell) in the column will experience a higher current (e.g., higher than every even fuel cell) and therefore experience a higher fuel utilization. The stress test allows a highly accurate evaluation of the effect of higher fuel utilization on any given fuel cell. The stress test may be applied to portions of the column in a periodic fashion thereby creating multiple instances of this test conditions. In this third embodiment, it is beneficial to achieve a uniform fuel utilization along the length of the column 410 in order for the stress test results using the measured fuel utilization of the stressed fuel cells to be meaningful.

Figure 8:
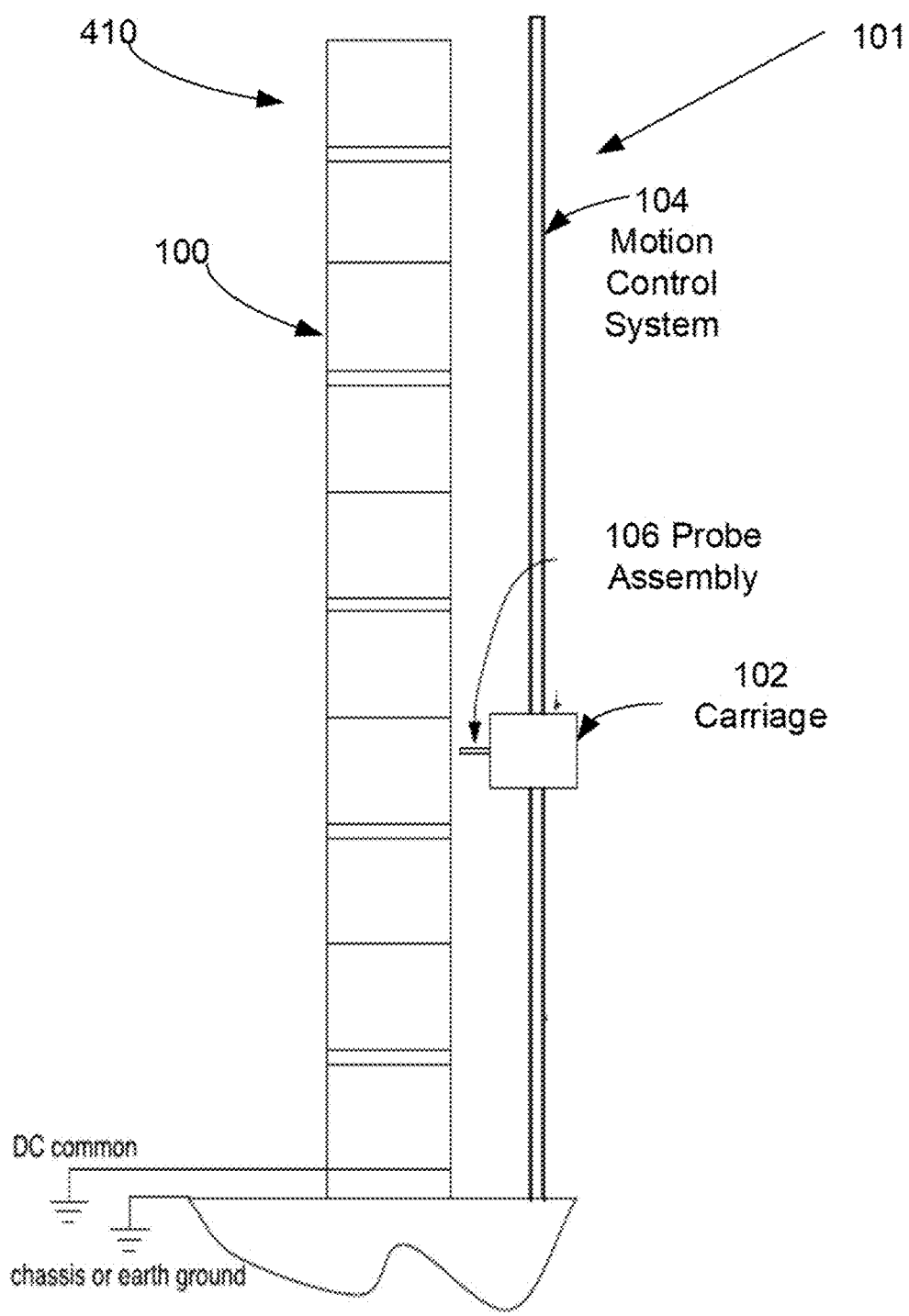
FIG. 8 is a schematic side cross-sectional view of a single column in a voltage probe system.

FIG. 8 is a schematic side cross-sectional view of a single column 410 located in a voltage probe system 101 described in U.S. Pat. No. 9,490,490 B2, which is incorporated herein by reference in its entirety. The voltage probe system 101 includes a carriage 102 which is moved by a motion control system 104. The carriage 102 includes a probe assembly 106 including one or more contact or non-contact voltage probes. For example, the voltage probes may be contact type voltage probes (i.e., electrical contactors) which contact the interconnects 50 of the fuel cell stacks 100 in the column 410. The movement of the carriage 102 moves probe assembly 106 along the length of the column 410. As illustrated in FIG. 8, the column 410 is oriented vertically and the probe assembly 106 moves vertically under the control of motion control system 104.

The voltage probe system 101 may be used for electrically testing the column 410 to determine the locations on the column 410 where the electrical connections (450, 550, 650) of the first, second and/or third embodiments will contact the column 410 and/or for the stress testing of the third embodiment. Alternatively, the probe assembly 106 may be used as the electrical connections (450, 550, 650) of the first, second and/or third embodiments to draw current from and/or to provide current to the column 410 by drawing and/or providing a voltage during the operation or seal sintering of the column 410. Thus, in one embodiment, the method of using the voltage probe system 101 includes at least one of drawing a voltage from or providing a voltage to the first column 410 using the voltage probe assembly 106 on a carriage 102 which is moved along a length of the first column 410.

According to the embodiments of the present disclosure, a fuel cell system (400, 500, 700) comprises a first column 410 which includes a first terminal plate 415a connected to a first electrical output 401 of the first column, a second terminal plate 415b connected to a second electrical output 401 of the first column, at least one first fuel cell stack 100 (e.g., 100a) located in a middle portion 408 of the first column 410 between the first terminal plate and the second terminal plate, and at least one electrical connection (450, 550, 650) which is electrically connected to the middle portion 408 of the first column 410 and which is configured to provide a more uniform fuel utilization across the first column 410.

According to the embodiments of the present disclosure a method of operating the fuel cell system (400, 500, 700) includes drawing a column current $I_1$ which flows in a first direction between a first terminal plate 415a and a second terminal plate 415b from at least one first fuel cell stack 100 (e.g., 100a) located in a middle portion 408 of a first column 410 between the first terminal plate 415a and the second terminal plate 415b, and at least one of drawing or providing at least one additional current (e.g., $I_2$ to $I_T$) from or to the middle portion 408 of the first column 410 to provide a more uniform fuel utilization across the first column 410.

In the first embodiment illustrated in FIG. 4C, the fuel cell system 400 further comprises a second column 420 comprising a third terminal plate 415c, a fourth terminal plate 415d, and at least one second fuel cell stack 100 (e.g., 100i) located between the third terminal plate and the fourth terminal plate, wherein the second column 420 is electrically connected in series and in parallel with the first column 410.

In one aspect of the first embodiment, the first column 410 and the second column 420 are located in the same hot box 120. The first electrical output 401 of the first column is electrically connected to the first terminal plate 415a of the first column and to the third terminal plate 415c of the second column, the second electrical output 401 of the first column is electrically connected to the second terminal plate 415b of the first column and to the fourth terminal plate 415d of the second column. The at least one first fuel cell stack 100a is electrically connected by the at least one electrical connection 450 (e.g., 450b) to the at least one second fuel cell stack 100i.

Preferably, the at least one first fuel cell stack comprises a plurality of first fuel cell stacks 100a-100h located in the middle portion 408 of the first column 410, and the at least one second fuel cell stack comprises a plurality of second fuel cell stacks 100i-100p located in the middle portion of the second column 420. A plurality of first fuel manifolds 417a-417d are located between the plurality of first fuel cell stacks 100a-100h, and a plurality of second fuel manifolds 417e-417h located between the plurality of second fuel cell stacks 100i-100p.

In one aspect, the at least one electrical connection 450 comprises a plurality of electrical connections 450b-450f, each of the first fuel manifolds 417a-417d is electrically connected by a respective one of the plurality of electrical connections 450b-450f to a respective one of the second fuel manifolds 417e-417h, and each of the plurality of first fuel cell stacks 100 comprises a first end plate 60, a second end plate 60, and a plurality of solid oxide fuel cells 10 separated by interconnects 50 located between the first end plate 60 and the second end plate 60. In a method of the first embodiment, the at least one fuel cell stack 100a contains at least one damaged fuel cell 10 which has a higher electrical resistance than fuel cells 10 of the at least one second fuel cell stack 100i, and at least one of drawing or providing at least one additional current comprises providing a portion of the column current $I_1$ from the first column 410 to the second column 420 to generate the additional current $I_2$ which flows in the first direction from the at least one first fuel cell stack 100a to the at least one second fuel cell stack 100i.

In the second embodiment illustrated in FIGS. 5B and 5C, the fuel cell system 500 further comprises a main output bus 535, an input/output circuit 530 containing a main DC/DC converter 520, and an additional DC/DC converter 510. The first and the second electrical outputs 401 of the first column 410 are electrically connected to the main output DC bus 535, the main output DC bus 535 is electrically connected to the main DC/DC converter 520, the at least one electrical connection 550 is electrically connected to both the middle portion 408 of the first column 410 and to the additional DC/DC converter 510, the middle portion 408 of the first column 410 comprises a central region 501 located between first and second outer regions 503, the first outer region 503 is located between the first terminal plate 415a and the central region 501, and the second outer region 503 is located between the second terminal plate 415b and the central region 501.

In the first aspect of the second embodiment illustrated in FIG. 5B, the at least one electrical connection 550 is electrically connected to the central region 501, the at least one additional DC/DC converter 510 is configured to provide a bypass current $I_4$ to the central region 501 through the at least one electrical connection 550, and in operation of the first column 410, the bypass current $I_4$ flows in an opposite direction to the column current $I_1$ which flows between the first terminal plate 415a and the second terminal plate 415b. Thus, in the first method of the second embodiment, the at least one of drawing or providing at least one additional current comprises providing the additional current $I_4$ to the central region 501, and wherein the additional current flows in an opposite second direction to the first direction.

In the second aspect of the second embodiment illustrated in FIG. 5C, the at least one electrical connection 550 is electrically connected to the outer regions 503, and the at least one additional DC/DC converter 510 is configured to draw additional currents $I_5$, $I_6$ from the outer regions 503 through the at least one electrical connection 550, in addition to the column current $I_1$ which in operation of the first column 410 flows between the first terminal plate 415a and the second terminal plate 415b. Thus, in a second method of the second embodiment, the at least one of drawing or providing at least one additional current comprises drawing additional currents $I_5$, $I_6$ from the outer regions 503, and wherein the additional currents flow in the first direction.

In the third embodiment illustrated in FIGS. 6 and 7, the first column 410 is located in a channel guide 600 configured for sintering of seals 54 of the first column 410, and the at least one electrical connection comprises a plurality of electrical connections 650 which are configured to draw trim currents $I_T$ from the middle portion 408 of the first column in addition to the column current $I_1$ which flows between the first terminal plate 415a and the second terminal plate 415b during the sintering of seals of the first column 410. The method of the third embodiment includes sintering seals 54 of the first column 410 while drawing the column current and the additional current(s) $I_T$ from the middle portion 408 of the first column 410 during the sintering.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A fuel cell system comprising:
a first column, wherein the first column comprises:
a first terminal plate connected to a first electrical output of the first column;
a second terminal plate connected to a second electrical output of the first column;
at least one first fuel cell stack located in a middle portion of the first column between the first terminal plate and the second terminal plate; and
at least one electrical connection which is electrically connected to the middle portion of the first column and which is configured to provide a more uniform fuel utilization across the first column; and
a second column comprising a third terminal plate, a fourth terminal plate, and at least one second fuel cell stack located between the third terminal plate and the fourth terminal plate, wherein the second column is electrically connected in series and in parallel with the first column.

2. The fuel cell system of claim 1, wherein:
the first column and the second column are located in a hot box;
the first electrical output of the first column is electrically connected to the first terminal plate of the first column and to the third terminal plate of the second column;

the second electrical output of the first column is electrically connected to the second terminal plate of the first column and to the fourth terminal plate of the second column; and the at least one first fuel cell stack is electrically connected by the at least one electrical connection to the at least one second fuel cell stack.

3. The fuel cell system of claim 2, wherein:

the at least one first fuel cell stack comprises a plurality of first fuel cell stacks located in the middle portion of the first column; and the at least one second fuel cell stack comprises a plurality of second fuel cell stacks located in the middle portion of the second column.

4. The fuel cell system of claim 3, further comprising a plurality of first fuel manifolds located between the plurality of first fuel cell stacks, and a plurality of second fuel manifolds located between the plurality of second fuel cell stacks.

5. The fuel cell system of claim 4, wherein:

the at least one electrical connection comprises a plurality of electrical connections;

each of the first fuel manifolds is electrically connected by a respective one of the plurality of electrical connections to a respective one of the second fuel manifolds; and each of the plurality of first fuel cell stacks comprises a first end plate, a second end plate, and a plurality of solid oxide fuel cells separated by interconnects located between the first end plate and the second end plate.

6. A fuel cell system comprising: a first column comprising:

a first terminal plate connected to a first electrical output of the first column;

a second terminal plate connected to a second electrical output of the first column;

at least one first fuel cell stack located in a middle portion of the first column between the first terminal plate and the second terminal plate;

at least one electrical connection which is electrically connected to the middle portion of the first column and which is configured to provide a more uniform fuel utilization across the first column; and a main output bus, an input/output circuit containing a main DC/DC converter, and an additional DC/DC converter, wherein:

the first and the second electrical outputs of the first column are electrically connected to the main output DC bus;

the main output DC bus is electrically connected to the main DC/DC converter;

the at least one electrical connection is electrically connected to both the middle portion of the first column and to the additional DC/DC converter;

the middle portion of the first column comprises a central region located between first and second outer regions;

the first outer region is located between the first terminal plate and the central region; and the second outer region is located between the second terminal plate and the central region.

7. The fuel cell system of claim 6, wherein:

the at least one electrical connection is electrically connected to the central region;

the at least one additional DC/DC converter is configured to provide a bypass current to the central region through the at least one electrical connection; and in operation of the first column, the bypass current flows in an opposite direction to a column current which flows between the first terminal plate and the second terminal plate.

8. The fuel cell system of claim 6, wherein:

the at least one electrical connection is electrically connected to the outer regions; and the at least one additional DC/DC converter is configured to draw additional currents from the outer regions through the at least one electrical connection, in addition to a column current which in operation of the first column flows between the first terminal plate and the second terminal plate.

9. A fuel cell system comprising a first column, wherein the first column comprises:

a first terminal plate connected to a first electrical output of the first column;

a second terminal plate connected to a second electrical output of the first column;

at least one first fuel cell stack located in a middle portion of the first column between the first terminal plate and the second terminal plate; and at least one electrical connection which is electrically connected to the middle portion of the first column and which is configured to provide a more uniform fuel utilization across the first column;

wherein:

the first column is located in a channel guide configured for sintering of seals of the first column; and the at least one electrical connection comprises a plurality of electrical connections which are configured to draw trim currents from the middle portion of the first column in addition to a column current which flows between the first terminal plate and the second terminal plate during the sintering of seals of the first column.

10. A method of operating a fuel cell system, comprising:

drawing a column current which flows in a first direction between a first terminal plate and a second terminal plate from at least one first fuel cell stack located in a middle portion of a first column between the first terminal plate and the second terminal plate; and at least one of drawing or providing at least one additional current from or to the middle portion of the first column to provide a more uniform fuel utilization across the first column; and a second column comprising a third terminal plate, a fourth terminal plate, and at least one second fuel cell stack located between the third terminal plate and the fourth terminal plate, wherein the second column is electrically connected in series and in parallel with the first column.

11. The method of claim 10, wherein:

the first column and the second column are located in a hot box;

the first terminal plate of the first column is electrically connected to the third terminal plate of the second column;

the second terminal plate of the first column is electrically connected to the fourth terminal plate of the second column; and the at least one first fuel cell stack is electrically connected to the at least one second fuel cell stack.

12. The method of claim 11, wherein:

the at least one first fuel cell stack comprises a plurality of first fuel cell stacks located in the middle portion of the first column; and the at least one second fuel cell stack comprises a plurality of second fuel cell stacks located in the middle portion of the second column.

13. The method of claim 12, wherein:
the at least one fuel cell stack contains at least one damaged fuel cell which has a higher electrical resistance than fuel cells of the at least one second fuel cell stack; and
at least one of drawing or providing at least one additional current comprises providing a portion of the column current from the first column to the second column to generate the additional current which flows in the first direction from the at least one first fuel cell stack to the at least one second fuel cell stack.

14. A method of operating a fuel cell system, comprising:
drawing a column current which flows in a first direction between a first terminal plate and a second terminal plate from at least one first fuel cell stack located in a middle portion of a first column between the first terminal plate and the second terminal plate; and
at least one of drawing or providing at least one additional current from or to the middle portion of the first column to provide a more uniform fuel utilization across the first column, wherein:
the middle portion of the first column comprises a central region located between first and second outer regions;
the first outer region is located between the first terminal plate and the central region; and
the second outer region is located between the second terminal plate and the central region.

15. The method of claim 14, wherein the at least one of drawing or providing at least one additional current comprises providing the additional current to the central region, and wherein the additional current flows in an opposite second direction to the first direction.

16. The method of claim 14, wherein the at least one of drawing or providing at least one additional current comprises drawing additional currents from the outer regions, and wherein the additional currents flow in the first direction.

17. A method of operating a fuel cell system, comprising:
drawing a column current which flows in a first direction between a first terminal plate and a second terminal plate from at least one first fuel cell stack located in a middle portion of a first column between the first terminal plate and the second terminal plate;
at least one of drawing or providing at least one additional current from or to the middle portion of the first column to provide a more uniform fuel utilization across the first column; and
sintering seals of the first column while drawing the column current and the additional current from the middle portion of the first column during the sintering.

18. A method of operating a fuel cell system, comprising:
drawing a column current which flows in a first direction between a first terminal plate and a second terminal plate from at least one first fuel cell stack located in a middle portion of a first column between the first terminal plate and the second terminal plate;
at least one of drawing or providing at least one additional current from or to the middle portion of the first column to provide a more uniform fuel utilization across the first column; and
at least one of drawing a voltage from or providing a voltage to the first column using a voltage probe assembly on a carriage which is moved along a length of the first column.

* * * * *